United States Patent [19]
Wright et al.

[11] Patent Number: 5,890,773
[45] Date of Patent: Apr. 6, 1999

[54] SYSTEM FOR ATTACHING A WHEEL LINER TO A WHEEL

[75] Inventors: James P. Wright; Garry Rodgers; John Davenport, all of Cookeville, Tenn.

[73] Assignee: Phoenix USA, Inc., Cookeville, Tenn.

[21] Appl. No.: 845,935

[22] Filed: Apr. 29, 1997

[51] Int. Cl.$^6$ .................................................. B60B 27/00
[52] U.S. Cl. .................................. 301/108.1; 301/108.1; 301/37.1
[58] Field of Search ................................ 301/37.1, 37.31, 301/37.32, 37.37, 108.1, 108.4

[56] References Cited

U.S. PATENT DOCUMENTS

| | | | |
|---|---|---|---|
| 4,458,952 | 7/1984 | Foster et al. | 301/37.37 |
| 4,709,967 | 12/1987 | Sakamoto | 301/37.1 |
| 4,768,838 | 9/1988 | Sakamoto | 301/37.31 |
| 4,822,109 | 4/1989 | Feria | 301/37.31 |
| 5,018,794 | 5/1991 | Oliver | 301/37.21 |
| 5,161,860 | 11/1992 | Sakane | 301/37.1 |
| 5,772,287 | 6/1998 | Sheu | 301/37.32 |

FOREIGN PATENT DOCUMENTS

| | | | |
|---|---|---|---|
| 2595071 | 9/1987 | France | 301/37.1 |
| 2505075 | 8/1976 | Germany | 301/37.37 |
| 404039102 | 2/1992 | Japan | 301/37.1 |
| 404146801 | 5/1992 | Japan | 301/37.1 |

Primary Examiner—D. Glenn Dayoan
Assistant Examiner—Long Bao Nguyen
Attorney, Agent, or Firm—Waddey & Patterson; Edward D. Lanquist, Jr.

[57] ABSTRACT

The present invention relates to an expandable ring system for attaching a wheel liner to a wheel. The wheel liner has clips attached to it. Through these clips, there is sliceable placed a ring. The ring surrounds all but one of the lug nuts and lies within the offset along an outer circumference of the lug nuts. However, the ring loops into the inner circumference of proximal one of the lug nuts to lengthen or shorten the ring. The ring can then be crimped to tighten the ring against the lug nuts. A spring can also be provided to surround all of the lug nuts along the outer circumference. Prior to placing the wheel liner on the wheel, the ring can be set at the desired length so that it frictionally fits over the desired lug nuts.

3 Claims, 6 Drawing Sheets

5,890,773

SYSTEM FOR ATTACHING A WHEEL LINER TO A WHEEL

BACKGROUND OF THE INVENTION

The present invention relates generally to wheel trim attachment systems and more particularly to a system for attaching a wheel liner using an expandable ring.

It will be appreciated by those skilled in the art that users desire to attach wheel liners to wheels. These wheel liners must be attached in a method so that the original lug nuts are not removed. Accordingly, there have been several attempts to perform this feat. However, applicants believe that the present feat is new. Such attempts have included lug nut encapsulators, nuts that attach to studs, set screws that attach to the lug nuts, and spring clips. These systems form merely different ways to attach a wheel liner to a wheel without removing the existing lug nuts.

What is needed, then, is a system which provides easy access for wheel and axle maintenance. This needed system must provide a secure method of attaching a wheel liner to a wheel. This system must provide protection to the axle hub, lugs, and lug nuts. This system must enhance the cosmetic appeal of the wheel. This system must enhance the vehicle and trailer identification. This system is presently lacking in the prior art.

SUMMARY OF THE INVENTION

The present invention relates to an expandable ring system for attaching a wheel liner to a wheel. The wheel liner has clips attached to it. Through these clips, there is slideably placed a ring. The ring surrounds all but one of the lug nuts and lies within the offset along an outer circumference of the lug nuts. However, the ring loops proximal the inner circumference of one of the lug nuts to allow the expandable ring to be enlarged or shortened. The ring can also be crimped to tighten the ring against the lug nuts. A spring can also be provided to surround all of the lug nuts along the outer circumference. Prior to placing the wheel liner on the wheel, the ring can be set at the desired length so that it frictionally fits over the desired lug nuts.

Accordingly, one object of the present invention is to provide a system for easy access to the wheel and axle for maintenance and inspection.

Another object of the present invention is to provide a secure method of attaching the wheel liner to the wheel.

Another object of the present invention is to protect the axle hub, lugs, and lug nuts.

Still another object of the present invention is to enhance the cosmetic appeal of the wheel.

A further object of the present invention is to enhance vehicle and/or trailer identification which would allow a logo to be put on the wheel liner.

DESCRIPTION OF THE PREFERRED EMBODIMENT

Figure 1:
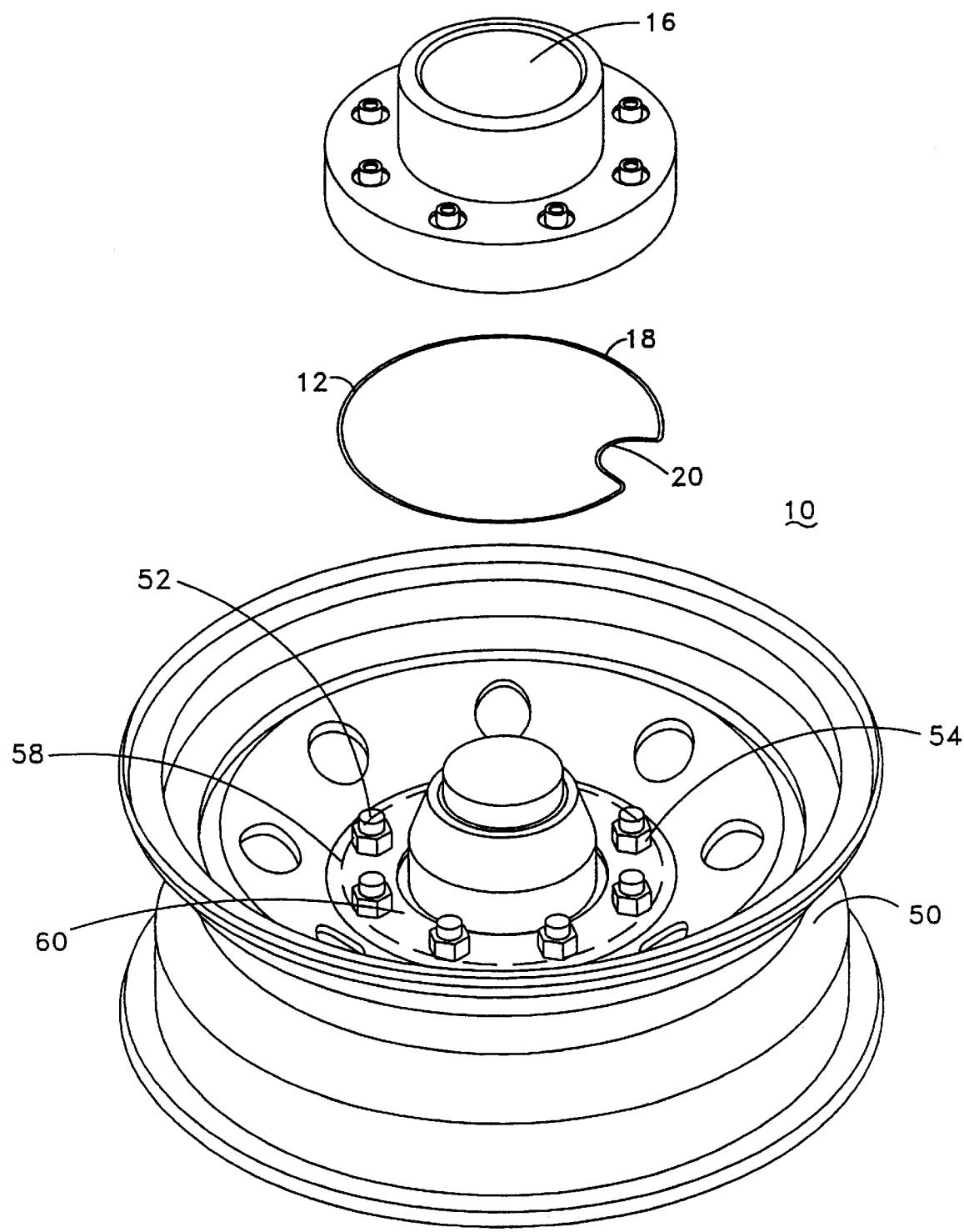
FIG. 1 is an exploded view of the device of the system of the present invention.

Referring now to FIG. 1, there is shown generally at 10 the system for attaching a wheel liner to the present invention. In the preferred embodiment, ring 12 having arc 18 and loop 20 is attached to liner 16. Wheel 50 has conventional lug nuts 54 which receive studs 52. Lug nuts 54 form inner circumference 60 and outer circumference 58. Ring 12 is attached to lug nuts 54 such that in the preferred embodiment, arc 18 attaches to several of said lug nuts 54 proximal outer circumference 58. Loop 20 travels proximal to inner circumference 60 proximal at least one of lug nuts 54. Size of arc 18 can be increased or shorten to respectively shorten or increase the circumference of ring 12. The sides of arc 18 can be increased or shortened to the desired size so that ring 12 frictionally fits over the desired lug nuts.

Figure 2:
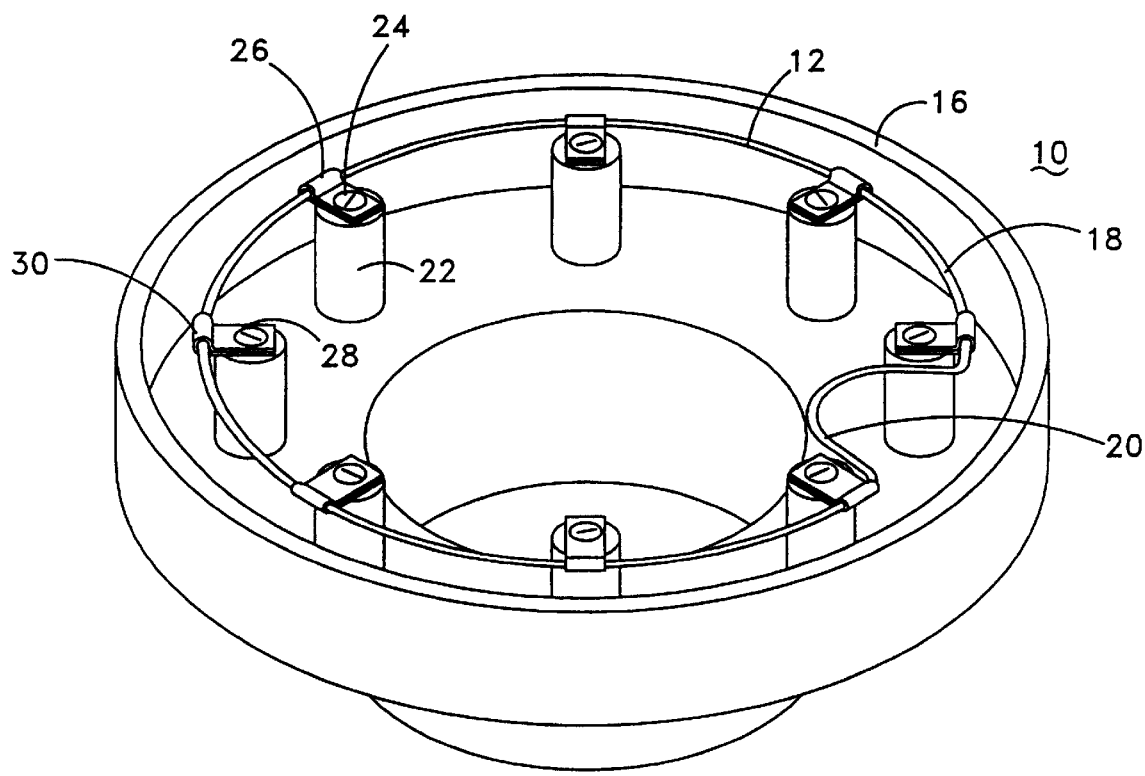
FIG. 2 is a perspective view of the wheel liner of the present invention.

Referring now to FIG. 2, there is shown generally at 10 another view of the system of the present invention. As can be seen, ring 12 having arc 18 and loop 20 is attached to liner 16 using, preferably, posts 22. Clips 26 slideably receive ring 12 and are attached to posts 22 using, preferably, screws 24. Clips 26, preferably, consists of cooperating and opposing flanges 28 attached by groove 30. Groove 30 slideably receives ring 12.

Figure 3:
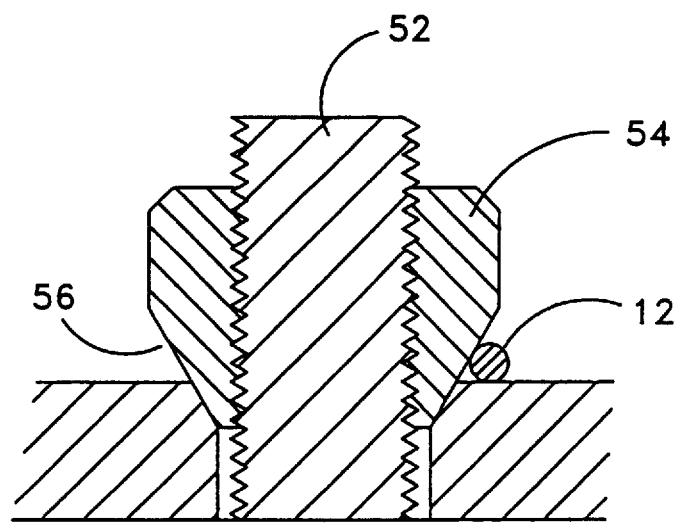
FIG. 3 is a cut-away view showing the lug nut and the ring of the present invention.

Referring now to FIG. 3, there is shown generally at 12 the ring of the present invention lying proximal lug nut 54. Lug nut 54, as stated above, receives stud 52. On most wheels, lug 54 has offset 56 which receives ring 12.

Figure 4:
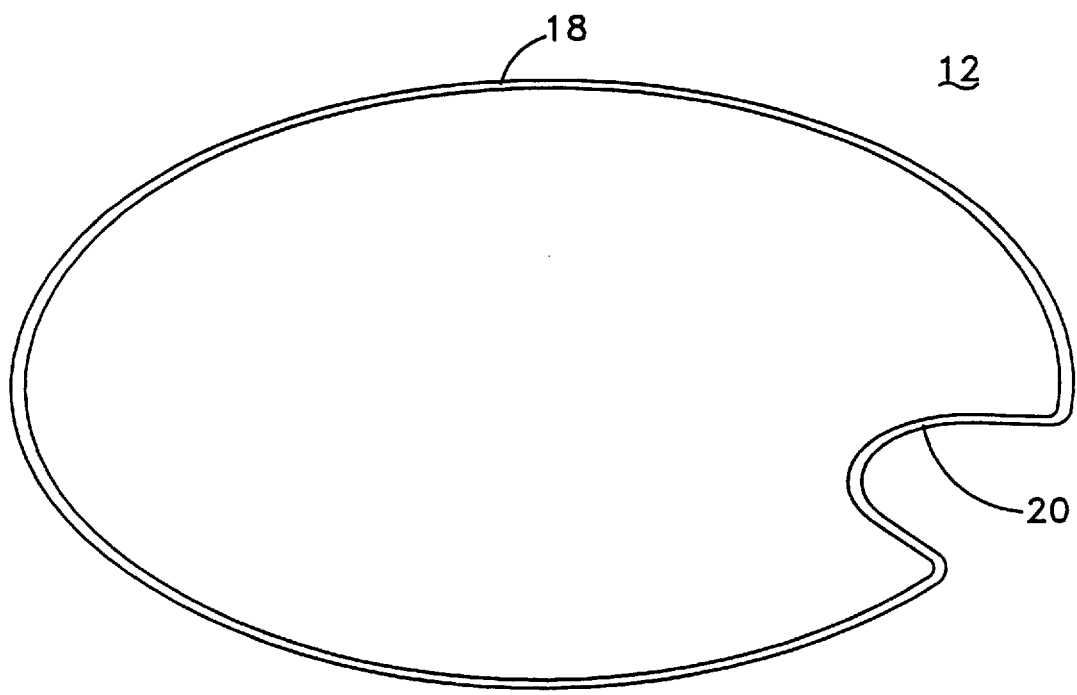
FIG. 4 is a perspective view of the ring of the present invention.

Referring now to FIG. 4, there is shown generally at 12 the ring of the present invention. As discussed above, ring 12 has arc 18 and loop 20.

Figure 5:
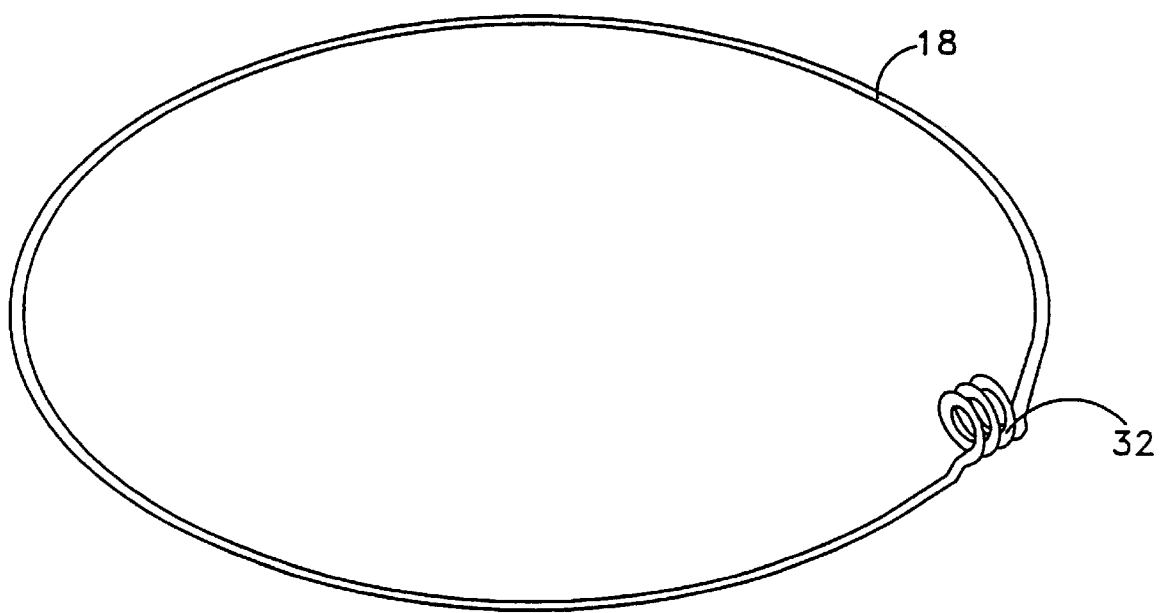
FIG. 5 is a perspective view of the ring showing a crimp.

Referring now to FIG. 5, there is shown generally at 12 another embodiment of the ring of the present invention. In this particular embodiment, ring 12 has arc 18 and crimp 32. In this embodiment, crimp 32 is a biasing spring which attempts to shorten the circumference of ring 12. Therefore, when ring 12 is passed over lug nuts 54, ring 12 contracts thereby resting into and hold proximal to offset (56 in FIG. 3).

Figure 6:
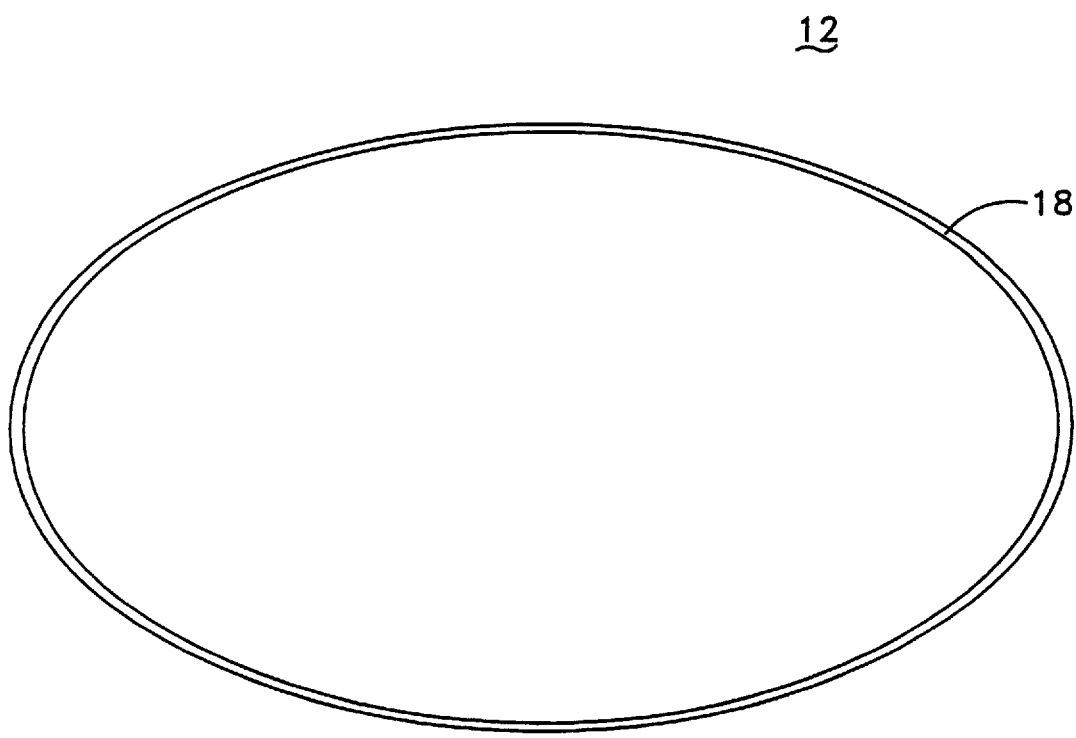
FIG. 6 is another perspective view of the ring of the present invention.

Referring now to FIG. 6, there is shown generally at 12 the ring of the present invention. In this particular embodiment, ring 12 is a completely arc 18 but it is elastic.

In the preferred embodiment, ring 12 is substantially 18.64 inches in circumference. Ring 12 is made of spring steel for ductile ring. Loop 20 of the present embodiment is preferably set on a radius of a curvature of 1.87 inches.

Thus, although there have been described particular embodiments of the present invention of a new and useful system for attaching a wheel liner to a wheel, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A wheel comprising system for attaching a liner to a wheel having lug nuts having an offset, said lug nuts having an inner circumference and an outer circumference, said system comprising:

a. a ring attached to said wheel at said lug nuts proximal said offsets;

b. plural clips slidably receiving said ring; and c. plural screws for attaching said clips to said liner.

2. A wheel comprising system for attaching a liner to a wheel having lug nuts having an offset, said lug nuts having an inner circumference and an outer circumference, said system comprising:

a. a ring attached to said wheel at said lug nuts proximal said offsets;

b. plural clips slidably receiving said ring; and c. wherein said clips comprise a pair of cooperating flanges joined by a groove for receiving said ring.

3. A system for attaching a liner to a wheel having lug nuts having an offset, said lug nuts having an inner circumference and an outer circumference, said system comprising:

a. a ring attached to said wheel at several of said lug nuts proximal said offsets of said lug nuts proximal said outer circumference and having a loop;

b. plural clips attached to said liner for slidably receiving said ring; and c. wherein said clips comprise a pair of cooperating flanges joined by a groove for receiving said ring.

* * * * *